United States Patent
Konz et al.

(10) Patent No.: US 8,707,612 B2
(45) Date of Patent: Apr. 29, 2014

(54) PHOSPHORESCENT FISHING LURE CHARGING BOX

(76) Inventors: Gordon Konz, South Lyon, MI (US); Richard Wunsch, Sterling Heights, MI (US)

(*) Notice: Subject to any disclaimer, the term of this patent is extended or adjusted under 35 U.S.C. 154(b) by 317 days.

(21) Appl. No.: 13/027,296

(22) Filed: Feb. 15, 2011

(65) Prior Publication Data

US 2011/0203157 A1 Aug. 25, 2011

Related U.S. Application Data

(60) Provisional application No. 61/306,103, filed on Feb. 19, 2010, provisional application No. 61/407,940, filed on Feb. 19, 2010.

(51) Int. Cl.
 *A01K 97/06* (2006.01)
 *A01K 85/01* (2006.01)

(52) U.S. Cl.
 USPC .............................. 43/17.5; 43/54.1; 362/154

(58) Field of Classification Search
 USPC ................ 43/17.6, 17.5, 54.1; 206/315.11; 224/920; 220/4.01, 4.28, 4.33, 692, 220/693; 362/154
 See application file for complete search history.

(56) References Cited

U.S. PATENT DOCUMENTS

| | | | | |
|---|---|---|---|---|
| 2,290,419 A | * | 7/1942 | Dunn | 362/156 |
| 2,517,914 A | * | 8/1950 | Nowaczek | 362/155 |
| 2,751,489 A | * | 6/1956 | Cole | 43/17.5 |
| 3,346,733 A | * | 10/1967 | Woolworth | 362/156 |
| 3,639,021 A | * | 2/1972 | Fee | 206/315.11 |
| 3,938,132 A | * | 2/1976 | Cunningham | 43/17.5 |
| 4,474,291 A | * | 10/1984 | Fortson | 43/54.1 |
| 4,621,308 A | * | 11/1986 | Holmberg et al. | 362/154 |
| 4,691,470 A | * | 9/1987 | Landell et al. | 43/17.5 |
| 4,697,379 A | * | 10/1987 | McPhaul | 43/54.1 |
| 5,311,413 A | * | 5/1994 | Farmer et al. | 43/17.6 |
| 5,333,408 A | * | 8/1994 | Simmons | 43/17.5 |
| 5,388,039 A | * | 2/1995 | Dolph | 43/17.6 |
| 5,555,671 A | * | 9/1996 | Voight et al. | 43/54.1 |
| 5,611,170 A | * | 3/1997 | McGuff et al. | 43/54.1 |
| 5,624,029 A | * | 4/1997 | Shih | 43/17.5 |
| 6,527,113 B2 | * | 3/2003 | Blake | 206/315.11 |
| 6,684,557 B1 | * | 2/2004 | Yu | 43/17.6 |
| 6,694,667 B2 | * | 2/2004 | Davis | 43/54.1 |
| 6,922,935 B2 | * | 8/2005 | Yu | 43/17.6 |
| 6,981,778 B2 | * | 1/2006 | Dow et al. | 362/156 |
| 7,040,308 B2 | * | 5/2006 | Ciesiun | 124/47 |
| 7,089,698 B2 | * | 8/2006 | Afshari | 43/17.5 |
| 7,278,417 B2 | * | 10/2007 | Ciesiun | 124/82 |

(Continued)

OTHER PUBLICATIONS http://randmsupply.com/productdisp.php?pid=763&navid=57, Nov. 28, 2010, 1 page.

*Primary Examiner* — Darren W Ark
(74) *Attorney, Agent, or Firm* — Brooks Kushman P.C.

(57) ABSTRACT

A charge box for charging phosphorescent fishing lures. The box includes a bottom, top and walls, the bottom and walls being connected to define an interior space, the top is hinged to the walls such that the box can be opened and closed. A reflective material covers the interior surface, along the bottom, top and walls. A light source is housed within the interior space and a power source is provided to energize the light source. Once the light source is energized it is reflected by the reflective surface, so the a phosphorescent fishing lure can be charged when placed into the interior space with the top closed.

4 Claims, 1 Drawing Sheet

(56) References Cited

U.S. PATENT DOCUMENTS

| | | | |
|---|---|---|---|
| 7,290,897 B2 * | 11/2007 | Schmidt | 362/190 |
| 7,364,318 B1 * | 4/2008 | Cruze | 362/154 |
| 7,516,864 B2 * | 4/2009 | Chen et al. | 220/4.33 |
| 8,123,061 B1 * | 2/2012 | Brown | 220/4.33 |
| 8,403,517 B1 * | 3/2013 | Cox et al. | 362/154 |
| 8,424,235 B1 * | 4/2013 | Anderson | 43/17.6 |
| 2004/0134114 A1 * | 7/2004 | Afshari | 43/4.5 |
| 2012/0125925 A1 * | 5/2012 | Brown | 220/4.28 |
| 2013/0048632 A1 * | 2/2013 | Chen | 220/4.33 |

\* cited by examiner

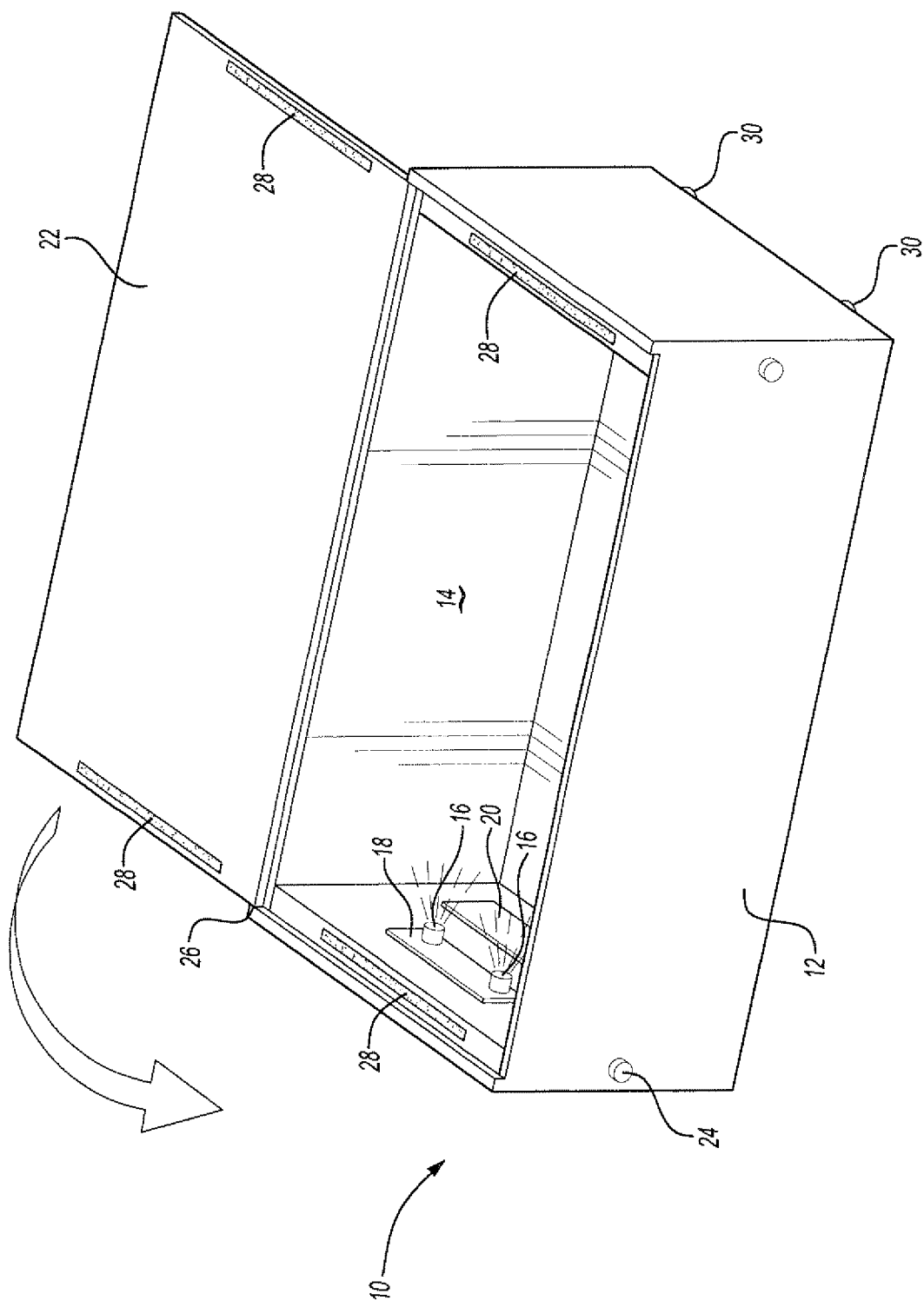

PHOSPHORESCENT FISHING LURE CHARGING BOX

RELATED APPLICATIONS

This application claims the benefit of U.S. Provisional Patent Application Ser. No. 61/306,103 for a FLUORESCENT FISHING LURE CHARGING BOX, filed on Feb. 19, 2010, and U.S. Provisional Patent Application Ser. No. 61/407,940 for a FLUORESCENT FISHING LURE CHARGING BOX, filed on Oct. 29, 2010, which is hereby incorporated by reference in its entirety.

STATEMENT REGARDING FEDERALLY SPONSORED RESEARCH

NONE

TECHNICAL FIELD

This invention relates generally to the charging of phosphorescent fishing lures and, more particularly, to a charging box into which phosphorescent fishing lures can be charged.

BACKGROUND OF THE INVENTION

Phosphorescent fishing lures are commonly used to attract various fish. These phosphorescent fishing lures have to be charged by light, in order to glow under water. Typically, fishermen charge the phosphorescent fishing lures with a flashlight. Charging fishing lures with a flashlight is a tedious process that requires the flashlight to be held closely to the fishing lure in order to get an appropriate charge. Since the lures lose their charge over time, they must be recharged or additional lures must be charged and be readied for use.

SUMMARY OF THE INVENTION

In general terms, this invention provides a convenient charging box into which one or more lures can be positioned for charging. The charging box of the disclosed embodiment has a light source and reflective surfaces, which provides very effective and efficient charging of lures.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 1 is a perspective view of the fluorescent or phosphorescent lure charging box of the present invention.

DETAILED DESCRIPTION OF A PREFERRED EMBODIMENT

With reference to FIG. 1, the phosphorescent fishing lure charging box is generally shown at 10. The charging box 10 has a charging compartment 12 which defines an interior chamber 14. The interior chamber 14 is lined with a reflective material to reflect the light emitted by the light source 16. In the disclosed embodiment, the reflective material is a foil lining, which could be either textured or smooth but could also be any number of other reflective materials known to those of ordinary skill in the art, such as for example, mirrors, reflective plastic sheeting, etc. The light source 16 of the disclosed embodiment is light emitting diodes, and more particularly ultra violet light emitting diodes, but could be any other light source known to those of ordinary skill in the art, such as for example a typical incandescent or florescent light bulb. The light source 16 is mounted within an electronics compartment 18, which also includes a power source for the light source 16. In the disclosed embodiment, the power source is a battery, but could be any other known power source, such as for example an a/c connection, a solar powered battery source, a hand cranked power source etc.

The disclosed box 10 includes a lid 22 which in the disclosed embodiment is also lined with a reflective material. Once closed, the chamber 14 is completely lined with reflective material, enhancing the reflection of the light emitted from the light source 16. In the disclosed embodiment, lid 22 is hinged to the compartment 12 by a hinge 26. The hinge 26 could be a typical metal or plastic hinge or a living hinge. Additionally, the disclosed embodiment includes a latch 28 for latching the lid 22 to the compartment 12. In this way, the box 10 can act as a tackle box and not only charge the florescent or phosphorescent fishing lures, but also acts as a storage compartment for the fishing lures.

The disclosed embodiment also includes thumbscrews 24 for securing the sides of the compartment 12 together. In this way, the box 10 can be quickly disassembled for storage by merely loosening the thumbscrews 24. As can be appreciated, each side includes various thumbscrews 24 for securing the sides together to define the chamber 14. Foot screws 30 are provide for securing the bottom of the compartment 12 to the sides to complete the chamber 14.

In the disclosed embodiment, the box 10 is made from plastic material. It should be appreciated by those of ordinary skill in the art that any sturdy material could be used to make the box 10. For example, the box could be made from wood, metal, corrugated cardboard, sturdy paperboard ect. Additionally, any desired shape could be used. In the preferred embodiment, the reflective material is diamond foil such as Xtreme Diamond Foil sold by R&M supply of California. Xtreme Diamond Foil is a textured reflective material that has a punched diamond pattern surface to disperse light. It is 97% reflective. In the preferred embodiment the reflective surface is adhered to the surfaces with an adhesive, such as for example an acrylic based or rubber based adhesive. In the preferred embodiment, the diamond foil, adhesive layer and the sides, bottom and top are laminated to provide a sandwich of foil adhered to the plastic walls, bottom and top.

In use, the light source 16 is energized and phosphorescent fishing lures are placed within the interior chamber 14. The lid 22 is closed allowing the phosphorescent lures to charge. Once charged, the lid 22 is opened and the charged lure(s) is removed for use.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A charge box for charging phosphorescent fishing lures comprising:
    a body having a bottom, a front wall, a back wall and two side walls, which are interconnected defining a rectangular cavity, the body including a moveable top disposed on the front, back and side walls opposite the bottom, wherein the two side walls are shorter in length than the front and the back walls, and wherein the bottom, front wall, back wall and two side walls are removably connected with fasteners such that the body can be disassembled for storage;

a light source housed at least partially within one of the side walls, the light source comprising an ultra violet light emitting diode;

a power source housed at least partially within the one of the side walls housing the light source, the power source being electrically connected to the light source for energizing the light source; and a reflective material substantially covering the interior surface of the body for reflecting and dispersing light emitted from the light source.

2. A charge box for charging phosphorescent fishing lures comprising:

a body having a bottom, a front wall, a back wall and two side walls, which are interconnected defining a rectangular cavity for receiving a fishing lure therein, the body including a top cooperating with the front, back and side walls opposite the bottom, the top being movable such that the body can be opened and closed, the side walls, front, back, top and bottom each having an interior side and an exterior side, wherein the bottom, front wall, back wall and two side walls are removably connected with fasteners such that the body can be disassembled for storage;

a light source housed at least partially between the interior side and the exterior side of one of the side walls such that energy from the light source is projected into the cavity for charging the fishing lure, the light source comprising an ultra violet light emitting diode;

a power source housed at least partially between the interior side and the exterior side of the one of the side walls housing the light source, the power source being electrically connected to the light source for energizing the light source; and a textured reflective material substantially lining the cavity for reflecting and dispersing light emitted from the light source.

3. The charge box of claim 2 wherein the body further comprises a living-hinge connecting the top to one of the front wall and the back wall.

4. The charge box of claim 2 wherein the ultra violet light emitting diode is at least two light emitting diodes.

* * * * *